United States Patent [19]

Cerutti-Maori et al.

[11] Patent Number: 5,131,747
[45] Date of Patent: Jul. 21, 1992

[54] INTERFEROMETRY DEVICE FOR FOURIER TRANSFORM MULTIPLEX SPECTRO-IMAGING APPARATUS AND SPECTRO-IMAGING APPARATUS CONTAINING THE SAME

[75] Inventors: Guy Cerutti-Maori, Cannes la Bocca; Denis Simeoni, Cannes, both of France

[73] Assignee: Aerospatiale Societe Nationale Industrielle, Paris, France

[21] Appl. No.: 566,446

[22] Filed: Aug. 27, 1990

[30] Foreign Application Priority Data

Dec. 28, 1988 [FR] France ............... 88 17328

[51] Int. Cl.⁵ ............................. G01B 9/02
[52] U.S. Cl. ................................ 356/346
[58] Field of Search ................. 356/345, 346

[56] References Cited

U.S. PATENT DOCUMENTS

| | | | |
|---|---|---|---|
| 3,684,379 | 8/1972 | Girard | 356/346 |
| 4,190,366 | 2/1980 | Doyle | 356/346 |
| 4,509,857 | 4/1985 | Vermande | |
| 4,523,846 | 6/1985 | Breckinridge et al. | 356/346 |

FOREIGN PATENT DOCUMENTS 0068922 1/1983 European Pat. Off. .
0207258 2/1984 Fed. Rep. of Germany ...... 356/346

OTHER PUBLICATIONS

*Applied Optics*, vol. 24, Nr. 24, Dec. 15, 1985, N.Y., US p. 4394, "Fourier transform infrared spectrometer".

*Primary Examiner*—Samuel A. Turner
*Attorney, Agent, or Firm*—Browdy and Neimark

[57] ABSTRACT

An interferometry device for Fourier transform multiplex spectrometric imaging designed to move relative to an object-zone according to a direction of motion constituting a reference direction for said interferometry device. The device includes a prismatic block of transparent material having a first and a second input-/output face meeting in a block edge, a semitransparent plate inside said block, and first and second reflective surfaces forming a roof and arranged facing respectively the first and the second input/output face via the semitransparent plate. The device further has at least one slanted dioptrical separation surface with a dioptry angle ($\alpha$) provided between one of the input/output faces and the corresponding reflective surface, and the deviation of the angles of inclination ($\beta$, $\beta'$) of the first and second rooflike reflective surfaces relative to the corresponding input/output face is non-zero.

22 Claims, 7 Drawing Sheets

INTERFEROMETRY DEVICE FOR FOURIER TRANSFORM MULTIPLEX SPECTRO-IMAGING APPARATUS AND SPECTRO-IMAGING APPARATUS CONTAINING THE SAME

The invention concerns an interferometry device adapted to be integrated into a FOURIER transform multiplex spectro-imaging system (or "spectro-imager").

A spectro-imager is moved parallel to an object-zone to be scanned, an area of ground, for example.

The principle of FOURIER transform multiplex spectro-imaging is known in itself, in particular from the document EP-0.068.922 which teaches how to use the relative movement of the terrestrial surface and an aircraft or a satellite for obtaining, thanks to light interference, spectral analysis observation of a set of contiguous elementary ground areas. This avoids any relative displacement of optical components of the interferometry device. The successive contents of an array or mosaic of CCD sensors on which the interference fringes are formed are used.

This document specifically describes an interferometry device in the form of a SAVART polariscope.

It has been found advantageous, in particular for reasons connected with the received light flux, to use a MICHELSON interferometer comprising a semi-reflecting mirror (beamsplitter) at 45° to the mutually orthogonal entry and exit beams. The semi-reflecting mirror splits the entry beam into two half-beams between which a path difference is introduced: after the semi-reflecting mirror recombines part of each half-beam an exit beam is obtained with which an interferogram can be constructed. Because two half-beams are used the expression "two-wave interferometer" is sometimes used.

An object of the invention is to improve the spectro-imaging system of the document EP-0.068.922 by providing an appropriate two-wave type interferometry device. It is directed in particular to:

increasing the usable energy gain and so enhancing the radiometric resolution;

improving the contrast of the fringes and so enhancing the spectral resolution;

keeping the interferometer device and the spectro-imager as a whole as compact and as light as possible;

making the path difference independent of the aperture angle of the incident beam;

retaining the same inclinations for the mean rays of divergent waves; and superposing the geometrical images very precisely.

A MICHELSON type (and therefore two-wave) interferometer device suitable for use in a spectro-imager of the type described in the document EP-0.068.922 was already known. This was the device described by GIRARD in the patent U.S. Pat. No. 3.684.379. This device differs from a conventional MICHELSON interferometer device in that it is formed by a prism whose cross-section, rather than being a constant, varies in the direction parallel to the edge of the prism at which two entry/exit faces of the prism merge (together with the semi-reflecting blade means situated in a plane bisecting the angle between these two surfaces); the cross-section is varied by adding along a surface parallel to one of the entry/exit surfaces prismatic blade means whose thickness varies parallel to said edge.

A GIRARD interferometer device of this kind has the disadvantage of using only half the incident energy, the other half being re-emitted in the direction opposite to that of the incident beam.

Also, spurious reflections due to the passage of the wave through the various optical surfaces are reemitted in part on the interferometer device exit path. These spurious reflections create spurious light in the plane of the mosaic of sensors, which decreases the contrast of the interferometer device fringes.

Finally, the basic principle of this interferometer device presupposes that the image is focused in the plane of the interferometer device mirrors: in this case various pollutants (dust, dirt, etc) or defects can be present in these material focal planes and cause significant reduction in the contrast of the interference fringes.

What is more, this focusing requirement entails the provision of an exit optical system (or transport optical system) for conjugating the plane of the interferometer mirrors and the plane of the mosaic.

An object of the invention is to alleviate some at least of these limitations.

To this end it proposes an interferometer device for multiplex FOURIER transform spectrometry, adapted to be scanned relative to an object-area in a scanning direction constituting a reference direction for said interferometer device, comprising a prismatic block of transparent material having first and second mutually orthogonal entry/exit surfaces merging at an edge of the block, semi-reflecting blade means in said block at 45° to said first and second entry/exit surfaces and passing through said edge of the block, and first and second reflecting surfaces respectively facing said first and second entry/exit surfaces through the semi-reflecting blade means, characterized in that:

each entry/exit surface is associated with a reference plane perpendicular to said entry/exit surface and parallel to said reference direction, at least one inclined dioptric separation surface is provided between one of the entry/exit surfaces and the associated reflecting surface, defining a non-null dioptric angle in the associated reference plane relative to said entry/exit surface, the first and second reflecting surfaces have fixed configurations and orientations relative to said block and each is roof-shape with the concave side facing the associated entry/exit surface and having a bisector plane parallel to said edge of the block and perpendicular to said associated entry/exit surface, said roof-shape surfaces having angles of inclination to the associated entry/exit surfaces in the reference planes with a non-null difference between them.

It will be understood that these roof-shaped or dihedral mirrors are known in themselves, including in combination with semi-reflecting blade means of a MICHELSON interferometer device, from the documents U.S. Pat. No. 4,190,366; U.S. Pat. No. 4,183,669; and U.S. Pat. No. 4,165,938. Note, however, that these documents concern a conventional MICHELSON device used for the spectral analysis of a fixed object; the various roof-shaped mirrors are all at right angles and have dihedral edges parallel to the entry/exit faces and to the semi-reflecting blade means. The path difference is introduced by translation movement of triangular prismatic blade means, without the mirrors having any direct influence on the size of the path difference. These documents teach a flux collector lens at the focus of which the object is placed and an imaging lens which forms the image in the plane of the sensors. These documents relate to a simple application, very different to the spectro-imaging system proposed by the document EP-0.068.922, and could not be used for spectro-imaging without substantial, non-obvious modifications.

It will be understood that by virtue of the invention:

1 all of the energy concentrated by the entry lens is usable;

2 spurious reflections due to the optical surfaces that the wave crosses are re-emitted towards the entry paths and not on the exit paths: they do not affect the quality of the interference fringes;

3 the image formed by the entry lens can be focused in any plane. It can be shown that the reduction in the contrast of the fringes due to defocussing of the image plane relative to the mirrors is due to separation of the virtual images on the two paths, which can be compensated by transverse displacement of one of the roof-shaped mirrors. For any given position of the focal plane it is therefore possible to determine a displacement of one of the roof-shaped mirrors which restores the contrast of the fringes, yielding the following advantages:

the image plane is not in the plane of the mirrors, which reduces the reduction in the contrast of the fringes if the mirrors are polluted;

in some cases, if the focal length of the lens forming the image is insufficient the image can be formed externally of the interferometer device and it is therefore unnecessary to provide an imaging lens; this favors miniaturization of the interferometer device +sensors combination: a cube with a side length of a few centimeters (approximately 5 cm) is sufficient whereas previously a cube with a side length four or five times greater was required.

According to preferred features of the invention:

the device has between each of the entry/exit surfaces and the associated reflecting surface dioptric separation surfaces of which the dioptric angles measured in the reference planes determine a dioptric angle difference such that the difference in inclination is in a predetermined ratio to said difference in dioptric angle conditioned by the indices of refraction of the media separated by said dioptric separation surfaces;

said difference in inclination is in a predetermined ratio to said dioptric angle conditioned by the indices of refraction of the media separated by said dioptric separation surfaces;

the predetermined ratio is $(n-1)/n$ where B is the refractive index of the material of the block;

the device comprises between the other of the entry/exit surfaces and the associated reflecting surface a plane dioptric separation surface parallel to said entry/exit surface and one of said reflecting surfaces has a roof-shape edge parallel to said edge of the block and has an aperture of 90°;

said parallel separation surface and said reflecting surface correspond to a single entry/exit surface.

In a first embodiment:

said reference direction being perpendicular to said edge of the block, said inclined dioptric separation surface is a dihedral formed by two plane surfaces inclined to the associated entry/exit surface at said dioptric angle and the intersection of which constitutes a dihedral edge parallel to said block edge and the associated roof-shape reflecting surface has a roof-shape edge parallel to said dihedral edge and said block edge and having said angle of inclination as the aperture angle.

at least one of the reflecting surfaces is adjustable in position in a transverse adjustment direction perpendicular to said block edge.

In a second embodiment, said reference direction being parallel to the block edge, said inclined dioptric separation surface is plane and is inclined to the block edge at said dioptric angle and the dihedral edge of the associated reflecting surface is inclined to the block edge at said angle of inclination.

The invention also proposes a spectro-imager equipped with the above interferometer device and preferably provided with a mosaic of sensors on each of its exit paths.

Objects, characteristics and advantages of the invention will emerge from the following description given by way of non-limiting example with reference to the appended drawings in which:

in FIG. 7;

Figure 1:
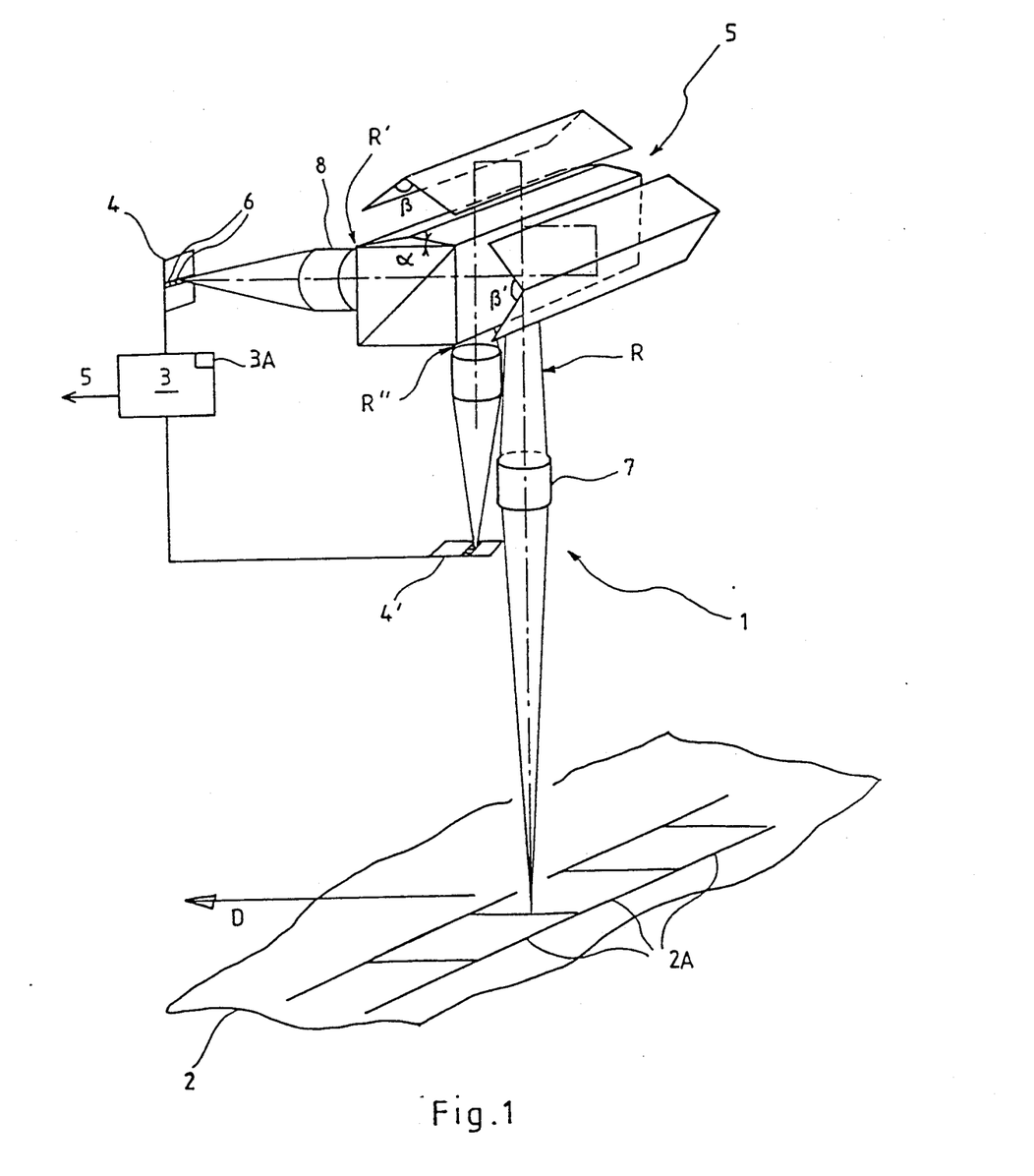
FIG. 1 is a schematic perspective view of a multiplex Fourier transform spectro-imaging system scanning in a direction D and incorporating an interferometer device in accordance with the invention.

FIG. 1 shows a multiplex Fourier transform spectro-imaging system 1 adapted to be moved parallel to an area of ground 2 in a scanning direction (here schematically represented by the arrow D) to form a spectrometer image of this ground area 2. The device 1 is mounted on an aircraft or a satellite (not shown), for example.

The spectrometer image is produced by a processor unit 3 equipped with a memory provided with a clock 3A, from successive images formed on a sensing device 4 by a MICHELSON interferometer device 5 (of the two-wave type) which has an entry optical system 7 and an exit optical system 8 and which receives light waves reflected from the ground area 2.

The sensing system 4 comprises an array (or mosaic) of charge-coupled device (CCD) sensors 6 each receiving a beam representative of an elementary area 2A of the ground area 2. At any given time the various sensors 6 receive respective beams emanating from respective elementary areas 2A and therefore contain one picture element or pixel of the image of the ground area 2. To simplify the figure there are respectively shown in the area A and in the sensing system 4 only strips of elementary areas 2A and sensors 6 in corresponding relationship and oriented transversely to the direction D.

Each pixel is sampled with a constant sampling period related to the scanning speed so that the information received by a sensor 6 at successive times represents contiguous elementary areas on the ground parallel to the direction D.

The ground area 2 scanned by the sensing system 4 moves in each time period by a distance equal to the size of an elementary area 2A and processing pixels received successively by a line of sensors from the same fixed elementary area of the ground and stored in the memory 3A enables the processor unit 3 to produce a spectrometer image S of this fixed elementary area.

The interferometer device 5 is designed so that the beam received by each sensor 6 is obtained by combining two beams obtained by dividing the beam emitted by an elementary ground area 2A and between which the interferometer device introduces a path difference which varies between elementary ground areas aligned parallel to the scanning direction D. In this way each elementary ground area is represented by successive beams received by separate, contiguous sensors and produced with different path differences. By identifying successive pixels representing a given elementary area 2A the processor unit 3 produces the spectral analysis of this area.

The principle of producing a spectrometer image by identifying successive pixels is known in itself and will not be described in more detail. For more details reference may be had to the previously mentioned document EP-0.068.922.

Figure 2:
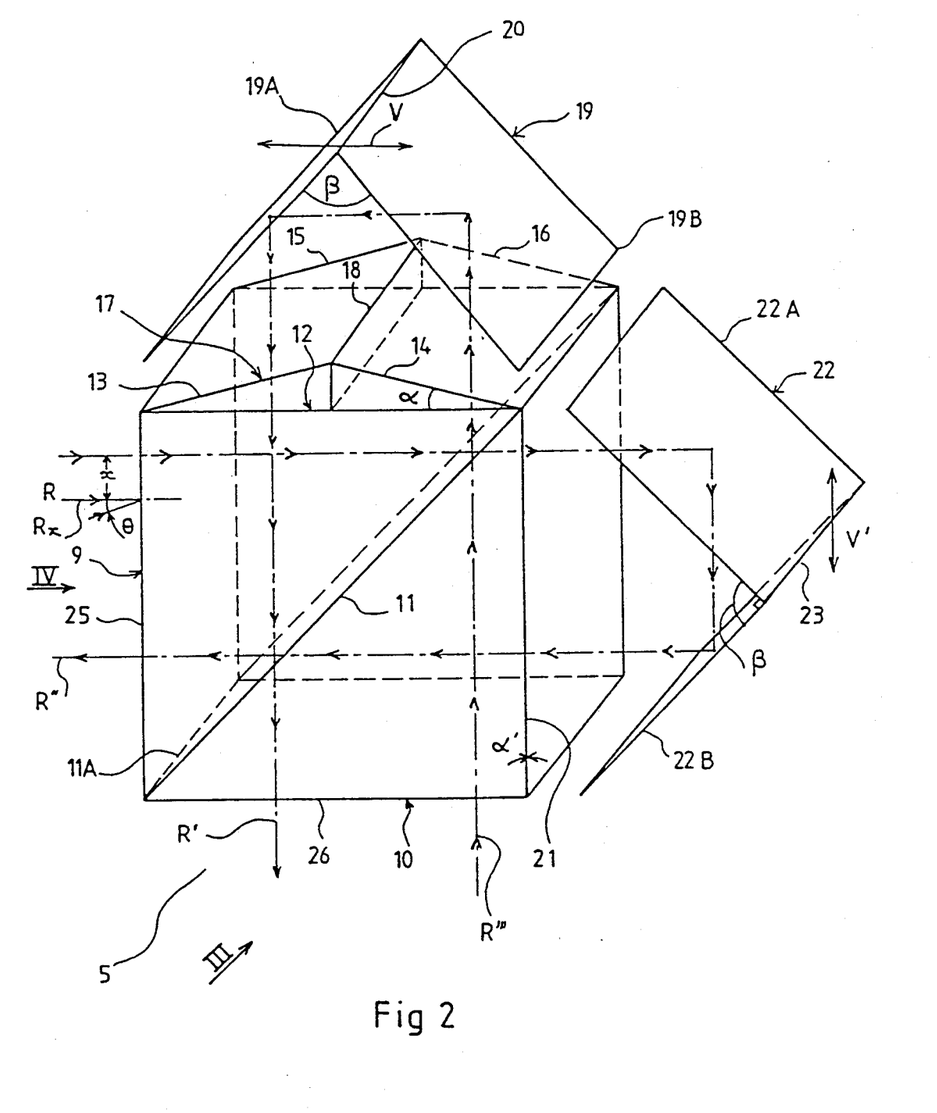
FIG. 2 is a perspective view of the interferometer device to a larger scale.
Figure 3:
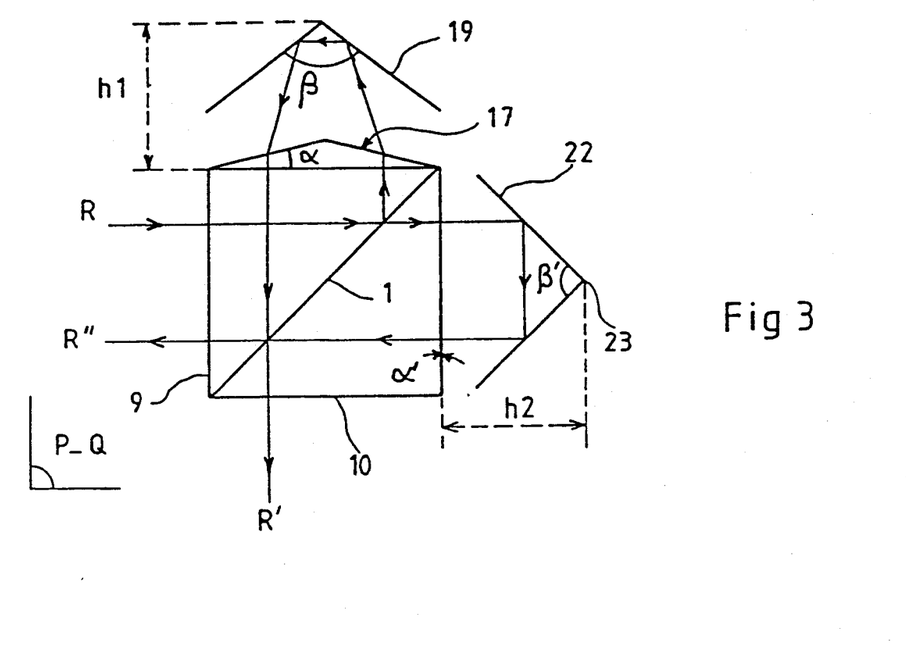
FIG. 3 is a front view in the direction of the arrow III in FIG. 2.
Figure 4:
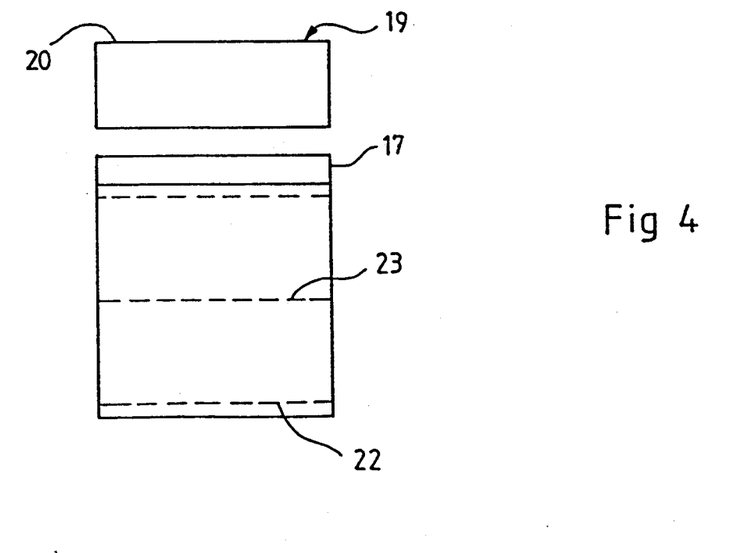
FIG. 4 is a side view in the direction of the arrow IV in FIG. 2.

The structure of the interferometer device 5 is shown in detail in FIGS. 2 through 4.

The interferometer device 5 comprises two identical transparent prisms 9 and 10 with the same refractive index, in practice of glass, with a right-angle triangular cross-section and with their largest surfaces in contact to form together a rectangular parallelepiped of square cross-section. These largest surfaces are treated in any appropriate known way so as together to constitute semi-reflecting blade means 11. For example, these two surfaces are coated with a dielectric material and bonded together by molecular adhesion.

To one of the side surfaces 12 of one of the prisms, in this instance the prism 9, are bonded two transparent prismatic blade means 13 and 14, in practice of glass, having a right-angle triangle (or right-angle trapezium) cross-section with their smallest surfaces in contact so that their largest surfaces 15 and 16 together define a flattened circumflex-shape dihedral separator surface 17 with the surfaces 15 and 16 at an angle o to the surface 12 and the dihedral edge 18 parallel to the semi-reflecting blade means 11. In practice these prismatic blade means are identical.

As the surface 17 separates two media with different indices of refraction it constitutes a dioptric separator surface of which o constitutes the dioptric angle.

The blade means 13 and 14 have a field compensating function.

The prisms 9 and 10 and the blade means 13 and 14 are preferably made from the identical glass.

In an alternative embodiment, not shown, the prism and the blade means 13 and 14 are all in one piece.

Facing the flattened circumflex-shape separator surface 17 is a roof-shape reflecting surface (or mirror) 9 formed by two reflecting surfaces 19A and 19B with an angle 8 between them. These reflecting surfaces meet at a dihedral edge 20 parallel to the semi-reflecting blade means 11. The bisector plane of this roof-shape mirror is parallel to and in theory coincident with the bisector plane of the circumflex-shape surface 17.

Facing the surface 21 of the other prism 10 (which is at right angles to the surface 12) is another roof-shape reflecting surface (or mirror) 22 formed by two reflective surfaces 22A and 22B with an angle $\beta'$ (in this instance a right angle) between them and meeting at a dihedral edge 23 parallel to the semi-reflecting blade means 11. The bisector plane of this roof-shape mirror 22 is in theory coincident with a plane perpendicular to the surface 21 on a median line of the latter. By analogy with what has been explained previously with regard to the surface 17, the surface 21 may be regarded as a separator surface with a null dioptric angle $\alpha'$, The roof-shape mirrors 12 and 22 are fixed in position relative to the prismatic block made up of the components 9, 10, 13 and 14 by any appropriate known means, not shown. In an alternative embodiment, not shown, the prism 21 extends as far as the reflecting surface 22 and there is no true dioptric separation surface; in this case, the reasoning is based on a null angle $\alpha'$, as previously.

The perpendicular surfaces 25 and 26 respectively opposite the surfaces 21 and 12 constitute orthogonal entry/exit surfaces for the light beams; the blade means 1 are located in the bisector plane of these surfaces and pass through their common edge 11A.

One or other of the reflecting surfaces 19 and 22 is advantageously movable laterally parallel to the surface 12 (double-headed arrow V) or parallel to the surface 21 (double-headed arrow V') to compensate any unintentional defocussing of the entry optical system 7 and the exit optical system 8 or deliberately to displace the image formed by the beam travelling on this path (reflected from the reflecting surface in question) so that, in the plane of the sensing device 4, the images formed by the two paths are coincident.

If n is the refractive index of the material of the prisms 9 and 10 and the prismatic blade means 13 and 14, the angle differences $\alpha-\alpha'$, and $\beta-\beta'$, are related by the equation:

$$\beta - \beta' = \frac{n-1}{n}(\alpha - \alpha')$$

The angle $\alpha$ is preferably between $10^{-4}$ and $10^{-3}$ radians, depending on the intended application; with visible light it is $1.5 \times 10^{-3}$ radians, for example.

FIG. 3 shows that an infinite beam whose mean ray is R intercepting the surface 25 travels through the prismatic block 9-10-13-14 until it reaches the blade means 11. The beam is divided into two half-beams (on two paths) which are respectively transmitted to the roof-shape mirror 22 and reflected towards the roof-shape mirror 19. After double reflection at the mirror 19 or 22 concerned, each of these half-beams passes through the block 9-10-13-14 in the reverse direction (and therefore after reflection/refraction through an angle of 180°) until they reach the semi-reflecting blade means 11 again where they are divided into two, respectively reflected and transmitted quarter-beams. By recombining these quarter-beams in pairs two exit beams with respective mean rays R' and R" are obtained.

The edges 20 and 23 are at distances h1 and h2 from the surfaces 12 and 21 such that, for the ray R normal to the surface 25, the path differences between the quarter-beams constituting the beams R' and R" are null.

For any other beam with mean ray Rx normal to the surface 25 intercepting the block 9-10-13-14 at a distance from the ray R, perpendicularly to the edge 11A and therefore in a plane perpendicular to the surface 25 and parallel to the direction D, the two half-beams (two paths) respectively transmitted and reflected by the blade means 11 have a path difference proportional to x. If the previously stated relationship between $(\alpha - \alpha')$ and $(\beta - \beta')$ is complied with this path difference is virtually independent of the aperture angle of the rays constituting the elementary beam whose mean ray is Rx. The previously mentioned relation amounts to canceling the $\theta^2$ term from the limited development of the expression (this will be obvious to those skilled in the art) giving the path difference for a given value of x as a function of the angle of inclination $\theta$ of an incident ray: this relation represents an optical field compensation condition.

The two quarter-beams respectively forming the exit beam with the mean ray R'x or R"x are conveyed by nonparallel mean rays at an angle to each other proportional to the path difference. According to the adjustment in direction V or V' of the position of the reflecting surfaces 19 or 22, the point of convergence of said mean rays of the aforementioned quarter-beams can be modified to modify the position of the plane of coincidence of the two images associated with these quarter-beams, without degrading the fringes.

It will be understood that the mirrors 19 and 22 decouple the entry and exit beams R and R' and that it is therefore possible to recover not only the beam R', as in the known solutions, but also the beam R", optionally through an exit optical system A'; by virtue of the sensing device 4' shown in FIG. 1, the processor unit 3 is able to produce the spectrometer image of the ground area 2 from all of the energy received by the interferometer device 5. R follows an entry path while R' and R" follow exit paths. The surfaces 25 and 26 are in fact interchangeable and there are two possible entry paths and R''' decoupled from the exit paths.

Figure 5:
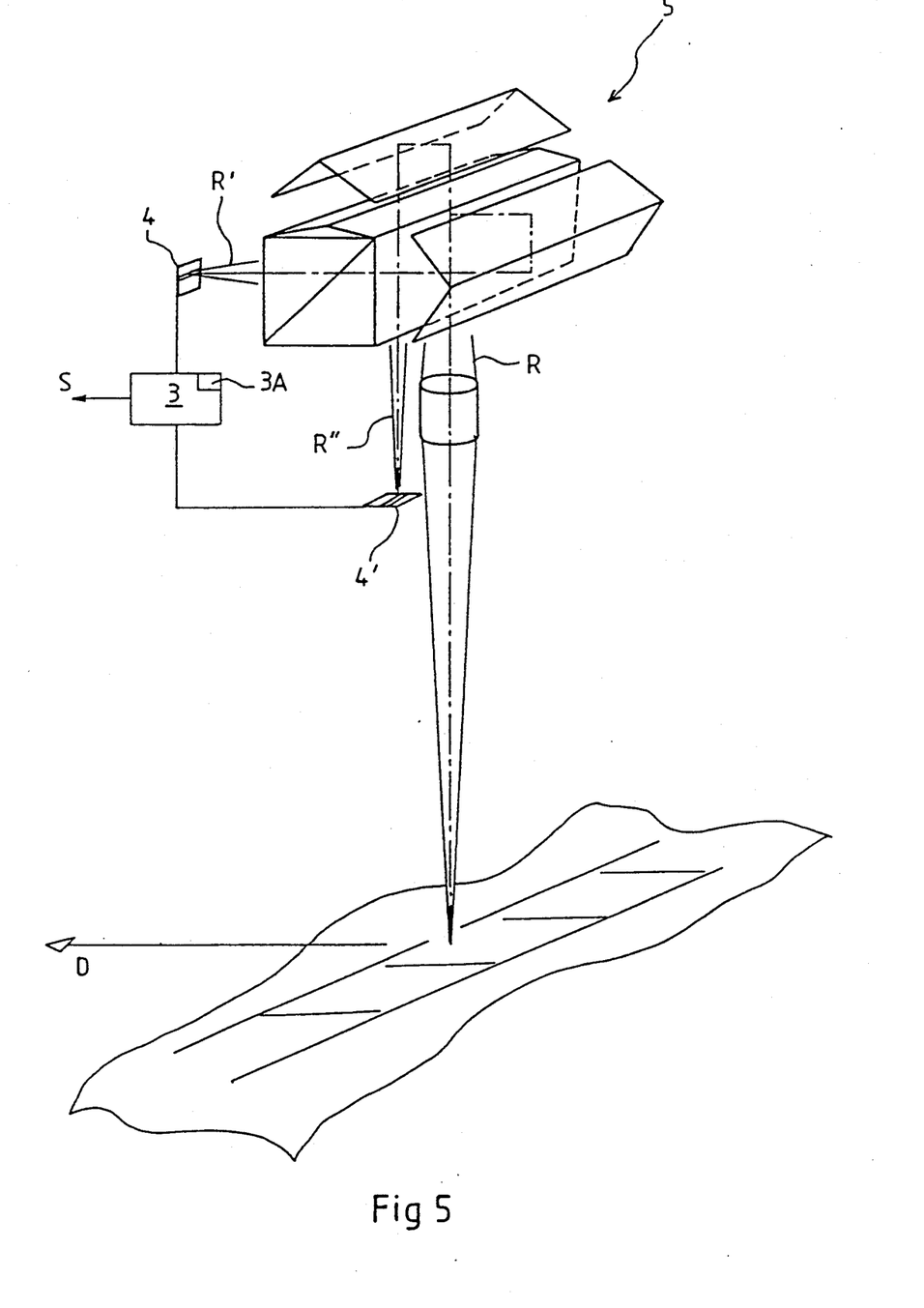
FIG. 5 is a schematic view of a simplified embodiment of the system from FIG. 1.

FIG. 5 is a variant of FIG. 1 in which the exit optical systems 8 and 8' have been eliminated, through exploiting the previously mentioned possibility of adjusting the plane of convergence of the quarter-beams. This represents a considerable space saving.

Figure 6:
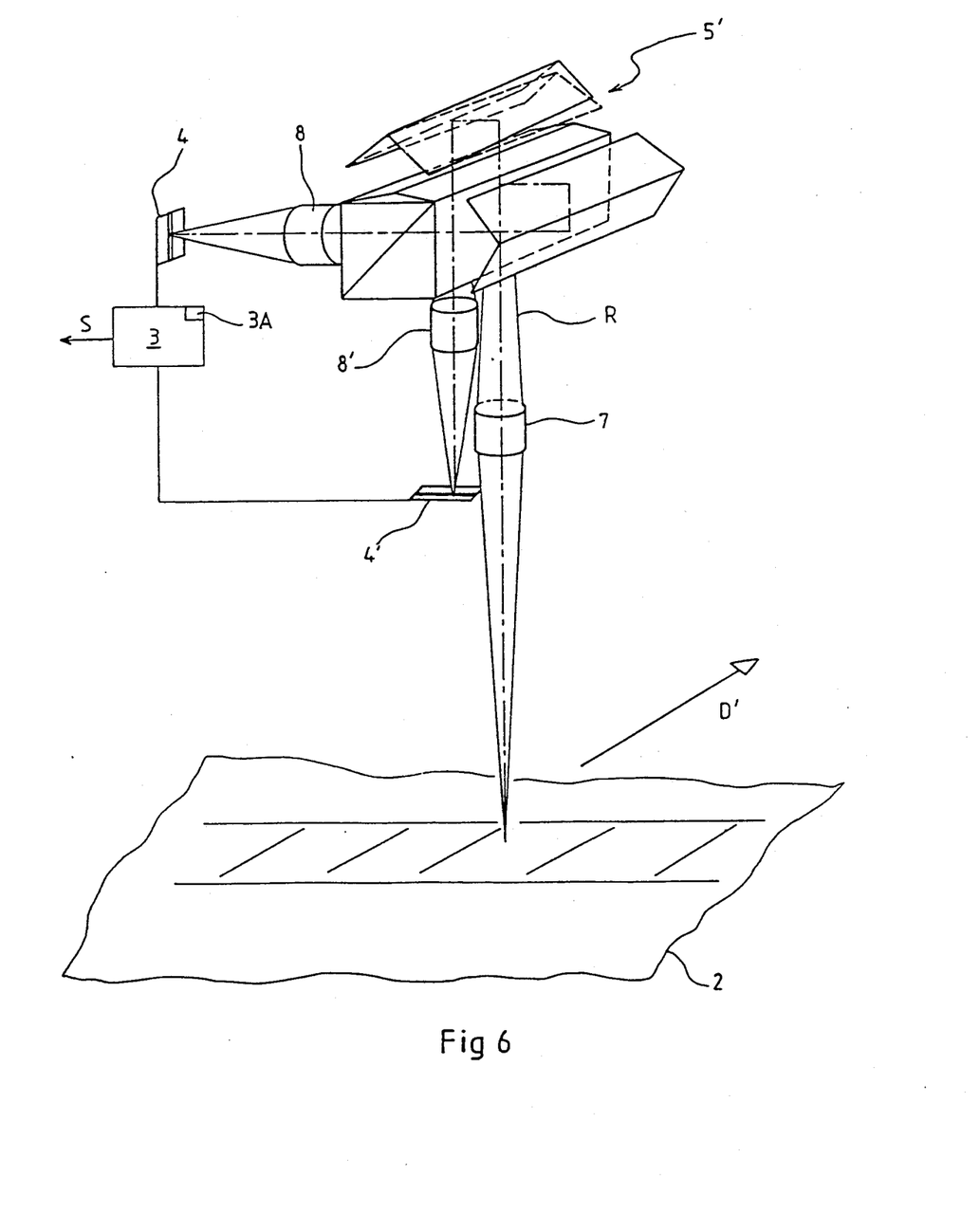
FIG. 6 is a schematic perspective view of another imaging system with a scanning direction D perpendicular to the direction D.

FIGS. 6 through 10 show an alternative embodiment of the interferometer device from FIGS. 1 through 4; FIG. 6 is a variant of FIG. 1 in which the device 5 has been replaced by a device 5' associated with a scanning direction D' perpendicular to direction D.

The device 5' similarly comprises two prisms 9, and 10' in contact at appropriately treated surfaces which together form semi-reflecting blade means 11'. The prism blocks 9' and 10, have parallel entry/exit surfaces 25 and 26' bordered by an edge 11'A and facing the surface 21' parallel to the surface 20' is a right-angle roof-shape reflecting surface 22' the bisector plane of which intercepts the surface 21 at right angles along a median line. Likewise the prism 9' has a surface 17' opposite the entry/exit surface 26' facing which is a roof-shape reflecting surface 19'.

Unlike the device 5, the surface 17' is plane, having relative to the surface 26 an inclination $\gamma$ parallel to the surfaces 25' and 21'. The roof-shape mirror 19' has reflecting edges 19'A and 19'B which define an edge 20' at an angle $\Psi$ relative to the surface 26'. The angle between these reflective edges, measured in a plane Ott' perpendicular to the surfaces 25' and 26', is equal to 90°.

Figure 7:
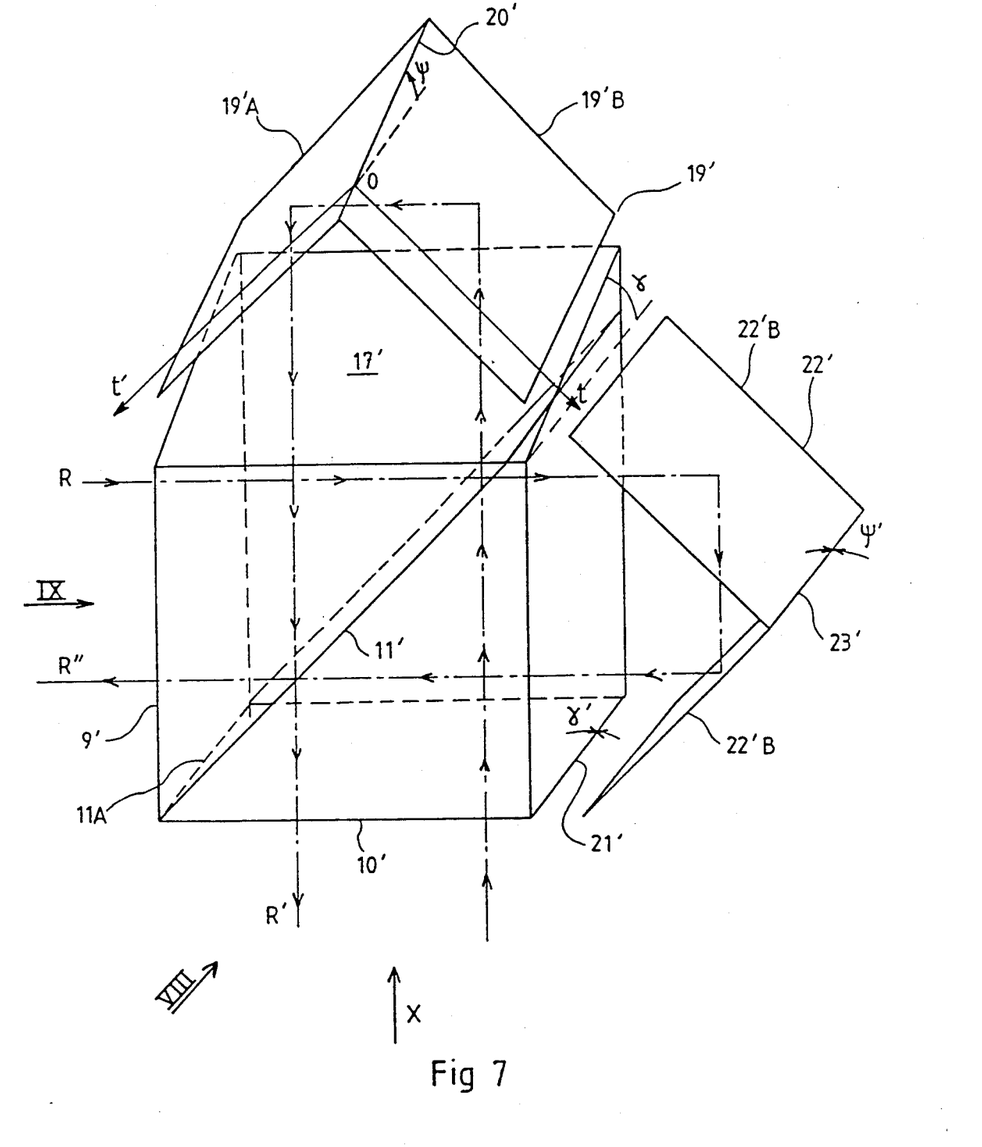
FIG. 7 is a perspective view of the interferometer device of the aforementioned other imaging system in another embodiment of the invention.

As an alternative, the aperture angle of these edges is 90°.

Figures 8, 9, 10:
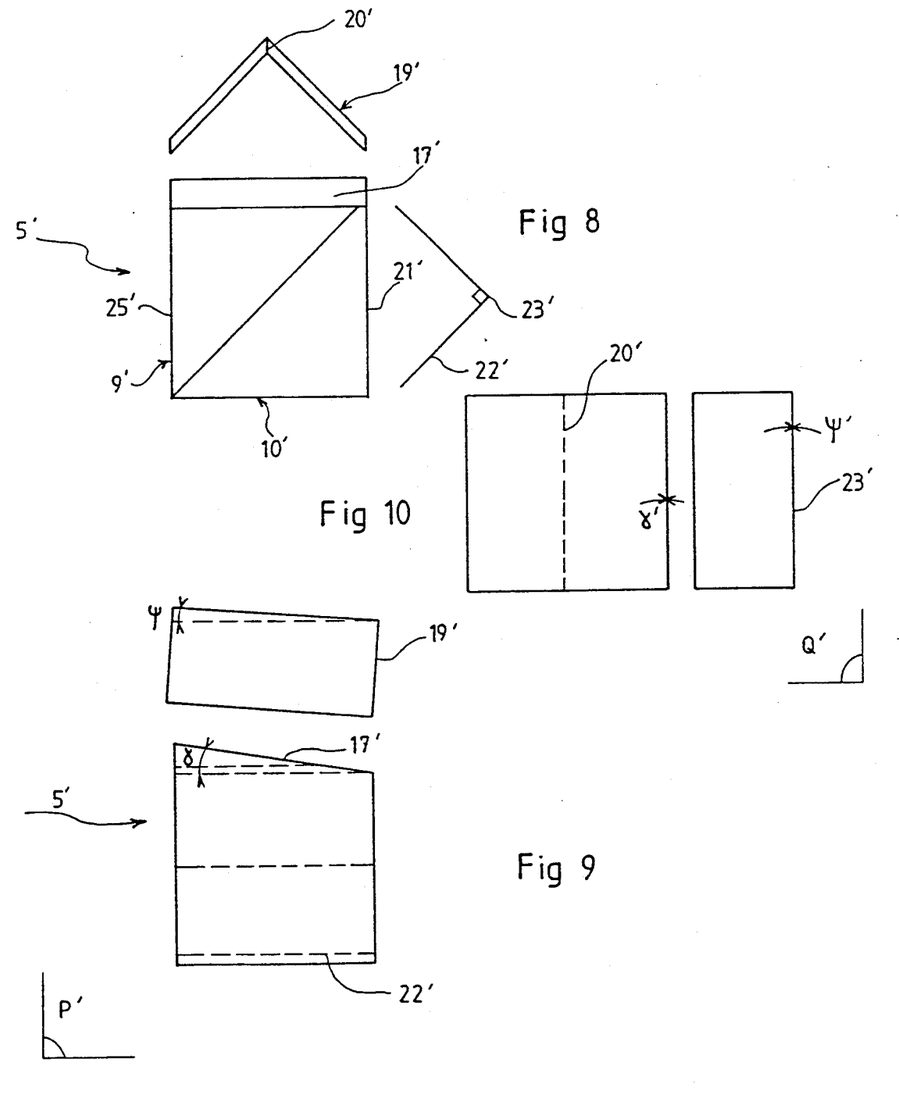
FIG. 8 is a front view of it in the direction of the arrow VIII.
FIG. 9 is a side view of it in the direction of the arrow IX in FIG. 7.
FIG. 10 is a bottom view of it in the direction of the arrow X in FIG. 7.

Null values may be defined for both angles $\gamma'$ and $\Psi'$ for the surface 21' and the reflecting surface 22' (see FIG. 10).

In this way the path difference for adjacent elementary ground areas is provided by the roof-shape mirrors 19' and 22' and the surface 17' provides field compensation.

If n is the refractive index of the material of the transparent members of the device 5' the angle differences $(\gamma - \gamma')$ and $(\Psi - \Psi')$ are related by the equation:

$$(\Psi - \Psi') = \frac{n-1}{n}(\gamma - \gamma')$$

The value of $\gamma$ is chosen in practice between $10^{-2}$ and $10^{-4}$ radians, depending on the intended application. For visible light the angle $\gamma$ is equal to $1.5 \times 10^{-3}$ radians, for example.

It will be understood that in the device 5':
both the complementary exit beams R' and R" are usable;
spurious reflections are re-emitted on the entry path of the interferometer device;
the focusing plane of the image formed by the entry lens is not in the plane of a material mirror.

It goes without saying that the foregoing description has been given by way of non-limiting example only and that numerous variants may be proposed by those skilled in the art without departing from the scope of the invention.

It will be understood that if for each entry/exit surface reference planes are defined perpendicular to the entry/exit surface and parallel to the reference direction (plane P-Q in FIG. 3 for the device 5 and planes P' and Q' in FIGS. 9 and 10 for the device 5,), then for both embodiments shown in FIGS. 1 through 10 at least one inclined dioptric separation surface is provided between one of the entry/exit surfaces and the associated reflecting surface, defining in the associated reference plane a non-null dioptric angle $\alpha$ or $\gamma$ relative to the entry/exit surface, and that the roof-shape reflecting surfaces have angles of inclination $\beta$ and $\beta'$ or $\Psi$ and $\Psi'$ to the associated entry/exit surfaces with a non-null difference in these reference planes. To be more precise, in each of these cases there is provided between each of the entry/exit faces and the associated reflecting surface a dioptric separation surface; the difference in inclination or $\beta - \beta'$ or $\Psi - \Psi'$ is in each case in a ratio of $(n-1)/n$ to the difference between the dioptric angles $(\alpha - \alpha')$ or $(\gamma - \gamma')$.

We claim:

1. Interferometer device (5, 5') for multiplex FOURIER transform spectrometry, adapted to be scanned relative to an object-area (2) in a scanning direction (D, D') constituting a reference direction for said interferometer device, comprising a prismatic block of transparent medium having first (25, 25') and second (26, 26') mutually orthogonal entry/exit surfaces merging at an edge of the block (11A), semi-reflecting blade means (11, 11') in said block at 45° to said first and second entry/exit surfaces and passing through said edge of the block, and first and second reflecting surfaces (22, 19) respectively facing said first and second entry/exit surfaces through the semi-reflecting blade means, characterized in that:

each entry/exit surface (25, 25', 26, 26') is associated with a reference plane (P-Q; P', Q') perpendicular to said entry/exit surface and parallel to said reference direction (D, D'), at least one inclined dioptric separation surface (17, 17') is provided between one of the entry/exit surfaces and the reflecting surface facing said one of the entry/exit surfaces, defining a non-null dioptric angle (α, γ) to said entry/exit surface in the associated reference plane, the first and second reflecting surfaces (22, 19); 22', 19') have fixed configurations and orientations relative to said block and each is roof-shape with the concave side facing the associated entry/exit surface and having a bisector plane parallel to said edge of the block and perpendicular to said associated entry/exit surface, said roof-shape surfaces having angles of inclination (β,β', Ψ, Ψ') to the associated entry/exit surfaces, in the reference planes with a non-null difference between them.

2. Device according to claim 1 characterized in that it has between each of the entry/exit surfaces and the associated reflecting surface dioptric separation surfaces (17, 17'; 21, 21') of which the dioptric angles (α, α'; γ, γ') measured in the reference planes determine a dioptric angle difference such that the difference in inclination is in a predetermined ratio to said difference in dioptric angle conditioned by the indices of refraction of the media separated by said dioptric separation surfaces.

3. Device according to claim 1 characterized in that said difference in inclination is in a predetermined ratio to said dioptric angle conditioned by the indices of refraction of the media separated by said dioptric separation surfaces.

4. Device according to claim 2 characterized in that the predetermined ratio is $(n-1)/n$ where n is the refractive index of the material of the block.

5. Device according to claim 1 characterized in that it comprises between the other of the entry/exit surfaces and the associated reflecting surface a plane dioptric separation surface parallel to said entry/exit surface and one of said reflecting surfaces has a roof-shape edge parallel to said edge of the block and has an aperture of 90°.

6. Device according to claim 5 characterized in that said parallel separation surface and said reflecting surface correspond to a same entry/exit surface.

7. Device according to claim 5 characterized in that, said reference direction being perpendicular to said edge of the block, said inclined dioptric separation surface (17) is a dihedral formed by two plane surfaces inclined to the associated entry/exit surface (26) at said dioptric angle (α) and the intersection of which constitutes a dihedral edge (18) parallel to said block edge (11A) and the associated roof-shape reflecting surface has a roof-shape edge (20) parallel to said dihedral edge (18) and said block edge (11A) and having said angle of inclination (8) as the aperture angle.

8. Device according to claim 7 characterized in that at least one of the reflecting surfaces (19) is adjustable in position in a transverse adjustment direction (V, V') perpendicular to said block edge.

9. Device according to claim 1 characterized in that, said reference direction being parallel to the block edge, said inclined dioptric separation surface (17') is plane and is inclined to the block edge at said dioptric angle (γ) and in that the dihedral edge (20') of the associated reflecting surface is inclined to the block edge by said angle of inclination (Ψ).

10. Multiplex FOURIER transform spectro-imaging system adapted to be moved in a scanning direction (D, D') relative to an object-area (2) comprising an interferometer device (5, 5') according to claim 1 an entry optical system (7) facing one of the entry/exit surfaces to receive beams emitted by said object-area, a sensing device (4) facing the other of the entry/exit surfaces formed by a two-dimensional array of elementary sensors (5) and a processor unit (3) incorporating a clock (3A) and adapted to note successive values of signals received by the elementary sensors to deduce therefrom a spectrometer image of said object-area.

11. System according to claim 10 characterized in that it comprises a sensing device (4, 4') facing each of the entry/exit surfaces (25, 25'), each of the sensing devices (4, 4') being connected to the processor unit (3).

12. An interferometer device for multiplex FOURIER transform spectrometry, adapted to be moved relative to an object area in a scanning direction parallel to a reference direction of said interferometer device, comprising a prismatic block of a transparent medium,
a reference edge of said block,
first and second planar entry/exit faces of said block merging at said reference edge and perpendicular to each other, with first and second respective reference planes being determined for said first and second entry/exit faces as being respectively perpendicular to said first and second entry/exit faces and parallel to said reference direction,
a semi-reflecting blade means extending from said reference edge into said block at 45° to said first and second entry/exit faces,
first and second reflective roof-shape surfaces with fixed configurations and orientations relative to said semi-reflecting blade means and with respective first and second concave sides respectively facing said first and second entry/exit faces through said semi-reflecting blade means, said respective first and second concave sides having respective bisector planes parallel to said reference edge and perpendicular, respectively, to said first and second entry/exit faces and having, in said first and second respective planes, respective first and second angles of inclination to said first and second entry/exit faces differing by a non-null inclination angle difference,
at least one inclined dioptric separation surface between said transparent medium and another medium facing one of said first and second entry/exit faces through said semi-reflecting blade and inclined relative to said respective reference plane of said one of said first and second entry/exit faces at a non-null dioptric angle.

13. The device of claim 12 further comprising another dioptric separation surface between said transparent medium and said other medium facing the other of said first and second entry/exit faces through said semi-reflecting blade means and inclined relative to said respective reference plane of said other of said first and second entry/exit faces at another dioptric angle, differing from said non-null dioptric angle by a dioptric angle difference such that said inclination angle difference is to said dioptric angle difference in a predetermined ratio defined as a function of indices of refraction of said media.

14. The device of claim 13 wherein said other dioptric separation surface is planar and said other dioptric angle is null.

15. The device of claim 13 wherein said predetermined ratio is (n−1)/n where n is the index of refraction of said transparent medium of the block.

16. The device of claim 14 wherein one of said first and second reflective roof-shape surfaces has an aperture of 90°.

17. The device of claim 16 wherein said one of said first and second reflective roof-shape surfaces and said other dioptric separation surface which is planar are facing a same one of said first and second entry/exit faces.

18. The device of claim 16, wherein said reference direction is perpendicular to said reference edge of the block,
- said inclined dioptric separation surface is a dihedron formed by two plane surfaces each inclined to said one of said first and second entry/exit faces at said non-null dioptric angle and merging at a dihedral edge parallel to said reference edge and
- the other one of said first and second reflective roof-shape surfaces is facing said inclined dioptric separation surface, is having a roof-shape edge parallel to said dihedral edge and to said reference edge and is having an aperture angle equal to said non-null dioptric angle.

19. The device of claim 18 wherein at least one of said first and second reflective roof-shape surfaces is adjustable in position in a transverse adjustment direction perpendicular to said reference edge.

20. The device of claim 12 wherein, said reference direction is parallel to said reference edge,
- said inclined dioptric separation surface is plane and is inclined to said reference edge at said non-null dioptric angle,
- one of said first and second reflective roof-shape surfaces is facing said inclined dioptric surface and having a dihedral edge inclined to said reference edge by said non-null inclination angle difference and determining with a plane perpendicular to said reference edge an intersection with an angle of 90°,
- the other of said first and second reflective roof shape surfaces is having a dihedral edge parallel to said reference edge and an aperture of 90°.

21. A multiplex FOURIER transform spectro-imaging system to be moved in a scanning direction relative to an object area comprising an interferometer device having a reference direction parallel to said scanning direction and comprising
a prismatic block of a transparent medium,
a reference edge of said block,
first and second planar entry/exit faces of said block merging at said reference edge and perpendicular to each other, with first and second respective reference planes being determined for said first and second entry/exit faces as being respectively perpendicular to said first and second entry/exit faces and parallel to said reference direction,
a semi-reflecting blade means extending from said reference edge into said block at 45° to said first and second entry/exit faces,
first and second reflective roof-shape surfaces with fixed configurations and orientations relative to said semi-reflecting blade means and with respective first and second concave sides respectively facing said first and second entry/exit faces through said semi-reflecting blade means, said respective first and second concave sides having respective bisector planes parallel to said reference edge and perpendicular, respectively, to said first and second entry/exit faces and having, in said first and second respective planes, respective first and second angles of inclination to said first and second entry/exit faces differing by a non-null inclination angle difference,
at least one inclined dioptric separation surface between said transparent medium and another medium facing one of said first and second entry/exit faces through said semi-reflecting blade and inclined relative to said respective reference plane of said one of said first and second entry/exit faces at a non-null dioptric angle,
an entry optical system facing one of said first and second entry/exit faces to receive beams emitted by said object-area,
a sensing device facing the other of said first and second entry/exit faces and formed by a two-dimensional array of elementary sensors and
a processor unit comprising a clock and adapted to store successive values of signals received by said elementary sensors and generate from said successive values a spectrometer image of said object-area.

22. The system of claim 21 further comprising another sensing device facing said one of said first and second entry/exit surfaces and connected to said processor unit.

* * * * *